(12) United States Patent
Agud et al.

(10) Patent No.: US 12,514,758 B2
(45) Date of Patent: Jan. 6, 2026

(54) COMPRESSION AND/OR CONTENTION GARMENT FOR LYMPHOEDEMA TREATMENT

(71) Applicant: THUASNE, Levallois Perret (FR)

(72) Inventors: Adrien Agud, Lemps (FR); Nathalie Gallien, Saint-Etienne (FR); Laurence Richard, Saint Just Malmont (FR); Leslie Joumard, Saint-Etienne (FR); Angélique Favier, Saint Just Saint Rambert (FR)

(73) Assignee: THUASNE, Levallois Perret (FR)

( * ) Notice: Subject to any disclaimer, the term of this patent is extended or adjusted under 35 U.S.C. 154(b) by 490 days.

(21) Appl. No.: 17/776,139

(22) PCT Filed: Nov. 16, 2020

(86) PCT No.: PCT/EP2020/082222
§ 371 (c)(1),
(2) Date: May 11, 2022

(87) PCT Pub. No.: WO2021/099251
PCT Pub. Date: May 27, 2021

(65) Prior Publication Data
US 2022/0378624 A1    Dec. 1, 2022

(30) Foreign Application Priority Data
Nov. 18, 2019   (FR) ..................... 1912843

(51) Int. Cl.
*A61F 13/08* (2006.01)
*D04B 1/18* (2006.01)
(Continued)

(52) U.S. Cl.
CPC .......... *A61F 13/08* (2013.01); *A41D 2400/32* (2013.01); *D04B 1/18* (2013.01);
(Continued)

(58) Field of Classification Search
CPC ....... A61F 13/08; A41D 2400/32; D04B 1/18; D04B 1/243; D10B 2331/02; D10B 2331/10; D10B 2331/12; A41B 11/003
(Continued)

(56) References Cited

U.S. PATENT DOCUMENTS

| | | | |
|---|---|---|---|
| 7,945,970 B2 * | 5/2011 | Belluye ................. | A41D 1/084 2/69 |
| 2005/0192524 A1 * | 9/2005 | Lipshaw ................ | A61F 13/06 602/62 |

(Continued)

FOREIGN PATENT DOCUMENTS

| | | |
|---|---|---|
| CN | 201267192 Y | 7/2009 |
| CN | 102083332 A | 6/2011 |

(Continued)

OTHER PUBLICATIONS

Excerpt of EN 14704-1:2005 prepared by the Technical Committee CEN/TC 248. (Year: 2005).*

(Continued)

*Primary Examiner* — Daniel A Miller
(74) *Attorney, Agent, or Firm* — NIXON & VANDERHYE

(57) ABSTRACT

Disclosed is a compression and/or contention garment for lymphoedema treatment, the garment including a main body made of a compression textile. The garment has at least a first targeted area, in which the garment includes at least one layer of reinforcement textile, and at least a second targeted area, in which the garment includes at least one layer of contention textile.

16 Claims, 4 Drawing Sheets

(51) Int. Cl.
  *D04B 1/24* (2006.01)
  *D04B 21/18* (2006.01)
  *D04B 21/20* (2006.01)

(52) U.S. Cl.
  CPC .............. *D04B 1/243* (2013.01); *D04B 21/18* (2013.01); *D04B 21/207* (2013.01); *D10B 2331/02* (2013.01); *D10B 2331/10* (2013.01); *D10B 2331/12* (2013.01); *D10B 2401/061* (2013.01); *D10B 2501/02* (2013.01); *D10B 2509/028* (2013.01)

(58) Field of Classification Search
  USPC .......................................................... 602/62
  See application file for complete search history.

(56) References Cited

U.S. PATENT DOCUMENTS

| | | | |
|---|---|---|---|
| 2008/0295216 | A1 | 12/2008 | Nordstrom et al. |
| 2011/0302686 | A1* | 12/2011 | Chapuis ............. A41D 13/0015 2/242 |
| 2013/0095730 | A1* | 4/2013 | Jensen ................... A41D 1/06 450/95 |
| 2014/0317823 | A1* | 10/2014 | Hanson ............... A41D 15/005 2/243.1 |
| 2015/0173428 | A1 | 6/2015 | Langer et al. |
| 2016/0338417 | A1 | 11/2016 | Kehler et al. |
| 2018/0303179 | A1 | 10/2018 | Konukoglu et al. |
| 2020/0397063 | A1 | 12/2020 | Biodrowski et al. |
| 2021/0395931 | A1 | 12/2021 | Convert et al. |

FOREIGN PATENT DOCUMENTS

| | | |
|---|---|---|
| CN | 202277401 U | 6/2012 |
| CN | 104640525 A | 5/2015 |
| CN | 205251770 U | 5/2016 |
| CN | 109068762 A | 12/2018 |
| EP | 2 449 901 | 5/2012 |
| FR | 3 027 195 | 4/2016 |
| JP | 2016509637 A | 3/2016 |
| JP | 2018102778 A | 7/2018 |
| WO | 2011/124849 | 10/2011 |
| WO | 2014114925 A1 | 7/2014 |

OTHER PUBLICATIONS

International Search Report dated Feb. 3, 2021, for PCT/EP2020/082222 (9 pp, including English translation).
Written Opinion of the International Searching Authority dated Feb. 3, 2021, for PCT/EP2020/082222 (8 pp.).
French Search Report dated Jul. 27, 2020, for FR1912843 (3 pp.).

* cited by examiner

COMPRESSION AND/OR CONTENTION GARMENT FOR LYMPHOEDEMA TREATMENT

This application is the U.S. national phase of International Application No. PCT/EP2020/082222 filed Nov. 16, 2020, which designated the U.S. and claims priority to FR FR1912843 filed Nov. 18, 2019, the entire contents of each of which are hereby incorporated by reference.

FIELD OF THE INVENTION

The present invention relates to a compression and/or contention garment for lymphoedema treatment, the garment comprising a main body, the main body being made of a compression textile.

BACKGROUND

Compression garments for lymphoedema treatment are already known.

For example, the Compreshorts® compression shorts model from SIGVARIS® in particular is indicated for the treatment of genital lymphoedema and has a compression class of between 10 and 15 mmHg, according to the supplier.

However, health professionals and patients criticize lack of effectiveness of the products available on the market due to a lack of strength and support in the main edema localization areas, such as the genitals, the pubis and/or the groin areas.

SUMMARY

An object of the invention is therefore to propose a compression and/or contention garment that is effective in lymphoedema treatment.

To this end, the invention has as its object a compression and/or contention garment for lymphoedema treatment, the garment comprising a main body, the main body being made of a compression textile, the compression textile having an elasticity strictly greater than 70% in at least one direction of extensibility, the compression textile having a module, in accordance with the ISO standard NF EN 14704-1 of June 2005 on determination of the elasticity of fabrics, greater than or equal to 3.5 N at an elongation of 40% on the fifth load curve in the direction of extensibility,
  the garment having at least a first targeted area in which the garment comprises at least one layer of reinforcement textile in the first targeted area, the garment having a module greater than the module of the compression textile in the first targeted area,
  the garment having at least a second targeted zone in which the garment comprises at least one layer of contention textile, the contention textile having a stiffness, in at least one direction of interest, greater than or equal to 30 N/(m*mm) over any normal range of use of the garment,
  the stiffness of the contention textile in the direction of interest being strictly greater than the stiffness of the main body in the direction of interest over a normal range of use of the garment,
  the stiffness of the contention textile in the direction of interest being strictly greater than the stiffness of the garment in the first targeted area in the direction of interest, more particularly by at least 100%.

The first and second targeted areas make it possible to apply different efforts to help drain the swollen member by containing it and by being capable of adapting to the morphology of the area to be treated and/or to apply pressure at specific locations where this must be significant tin order to effectively drain the member. The first targeted area, in particular, make it possible to provide more support through a greater rigidity than outside the targeted areas. The second targeted area it possible to apply significant force as soon as the volume of the member increases by a minimum value, for example, in the case of swelling of the lymphoedema.

The compression and/or contention garment may further have one or more of the following features, considered individually or in any technically possible combination:
  the direction of extensibility of the compression textile and/or the direction of interest corresponds to a circumferential direction of the garment,
  the compression textile is provided so that the compression textile requires a stretching force in the direction of extensibility greater than or equal to 7N to achieve an elongation of 40% in a first stretching cycle,
  the contention textile is intended to extend at least against a user's pubic area user and/or a user's inner thighs,
  the reinforcement textile is intended to extend at least against a user's groin, buttock crease, pubic area, and/or buttocks,
  the main body extends over the entire garment except for the, or each, or at least one of the second targeted areas,
  the main body comprises at least a first part and a second part, the first part and the second part each capable of being cut from a flat pattern, the first part and the second part each comprising a connecting edge, the connecting edge of the first part and the connecting edge of the second part not complementing each other, the connecting edge of the lower first part being connected to the connecting edge of the upper second part by a dart,
  the dart is intended to extend at least against the groin and/or the user's buttock crease,
  the compression and/or reinforcement textile comprises, more particularly is composed of polyamide and elastane, and/or
  the garment has at least one pocket capable of removably receiving at least one padding element.

BRIEF DESCRIPTION OF THE DRAWINGS

Further features and advantages of the invention will become apparent from the following description of embodiments of the invention, given only by way of example and with reference to the drawings in which.

DETAILED DESCRIPTION

Figure 1:
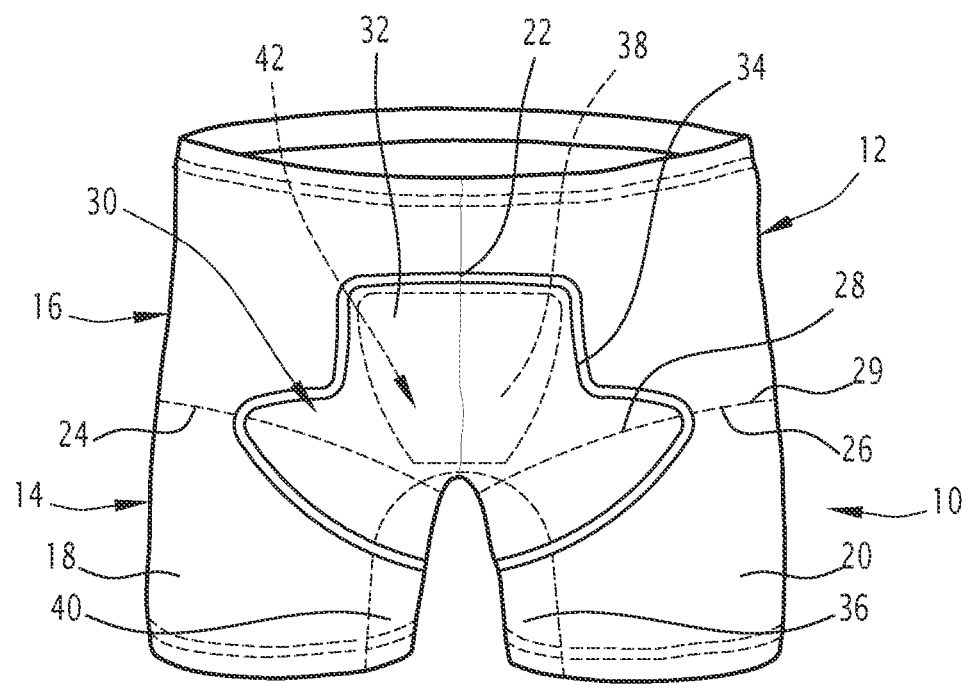
FIG. 1 is a schematic front view of a garment according to one embodiment of the invention.
Figure 2:
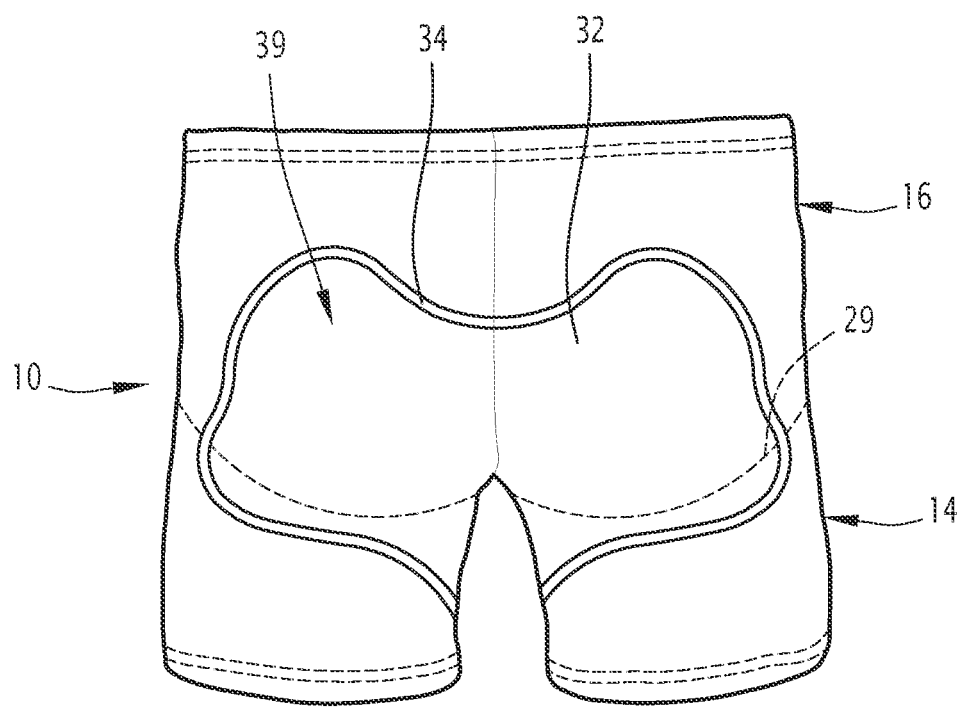
FIG. 2 is a schematic view of the back of the garment of FIG. 1, and FIGS. 3 and 4 are schematic front and back views, respectively, of an example pattern of the garment of FIGS. 1 and 2.

One embodiment of a compression and/or contention garment 10 for the treatment of lymphoedema according to the invention is shown in FIGS. 1 and 2.

The garment 10 here is intended to treat genital and/or pelvic lymphoedema.

The garment 10 is a panty in the example shown, that is, a high-waisted panty extending down the thighs.

At each point of the garment, a circumferential direction is defined, intended to correspond to a circumferential direction of a transverse plane of a user wearing the garment.

The garment 10 is adapted to the morphology of a user. For example, the garment 10 is developed in different sizes, with the garment size adapted to a user being selected based on the user's pelvic girth.

The garment 10 comprises a main body 12.

In one embodiment, the main body 12 extends over the entire surface of the garment 10.

The main body 12 has an inner face adapted to extend at least partially against the user and an outer face opposite the inner face.

The main body 12 is made of a compression textile.

The main body 12 here has a single layer or thickness of compression textile.

The compression textile is here a bi-elastic fabric, that is, elastic along two non-parallel extension directions of the fabric, here the extensibility direction and the direction perpendicular to the extensibility direction.

In a variant, the compression textile is an elastic fabric in a single direction.

In a variant, the compression textile is a bi-elastic knit fabric.

The compression textile has an elasticity strictly greater than 70% in at least one direction of extensibility.

The direction of extensibility of the compression textile corresponds to the circumferential direction over the entire main body 12.

The compression textile has a module in the direction of extensibility.

The module is measured in accordance with the NF EN 14704-1 standard of June 2005 on the determination of the elasticity of fabrics.

More specifically, a strip of the material is cut.

The strip extends between two ends along a direction of interest in which the module is to be measured, here the direction of extensibility.

The strip has a given width, measured perpendicular to the direction of interest.

The strip is stretched at least a given number of stretching cycles; the given number is equal to 5.

For each cycle, the strip is stretched in the direction of interest by a force, gradually increasing to a predetermined force, equal to 6N per centimeter of strip width, for example. For example, the strip has a width of 5 centimeters and is therefore stretched by a force gradually increasing to 30N.

The strip is stretched with a dynamometer, for example, each end of the strip being held by a respective clamp, one fixed while the second performs the traction/relaxation cycles by going back and forth along an axis, for example.

The elongation of the strip, depending on the force applied, is measured.

Then, the stretching of the band is reduced by a progressive return to the initial position, more particularly of the clamp moving towards its initial position. A new stretching cycle can then be started.

The module here is the force corresponding to an elongation of 40% throughout the fifth cycle during the phase of gradually increasing the force.

The compression textile has a module in the direction of extensibility greater than or equal to 3.5 N for a 5 centimeter wide strip.

Furthermore, the compression textile is such that, apart from the first stretching cycle, the curves showing the elongation depending on the force applied during the various cycles are superimposed to within 5%, at least between the cycles between the second and fifth cycles inclusive.

This makes it possible to produce a product that is stable over time.

Moreover, during the first stretching cycle, the compression textile requires a stretching force in the direction of extensibility greater than or equal to 7N to obtain an elongation of 40% of a 5 centimeter wide strip.

This makes it possible to achieve a desired force with a small amount of stretching. Thus, the garment advantageously has dimensions close to those of the user wearing the garment, making it easier to put on.

The compression textile comprises, for example, more particularly consists of polyamide and elastane. Here, the compression textile comprises 40% to 50%, more particularly 48% elastane and 50% to 60%, more particularly 52% polyamide for example.

In the embodiment shown, the main body 12 comprises, more particularly consists of, a first part 14 and a second part 16.

The first part 14 corresponds to a lower part, and the second part 16 corresponds to an upper part.

The lower part 14 is formed here of two parts 18, 20 intended to extend around a user's thighs. The upper part 16 is provided to extend around a user's pelvis and to connect the two parts 18, 20 of the lower part 14.

Figure 3:
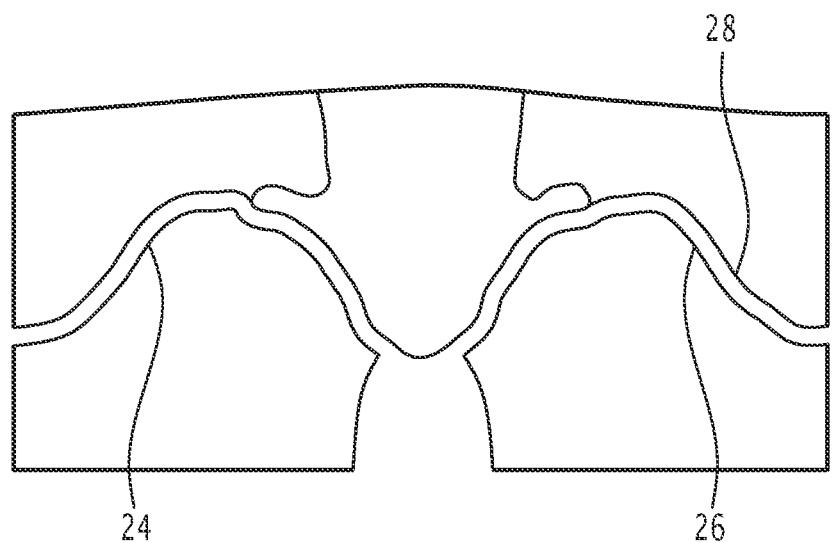
Figure 4:
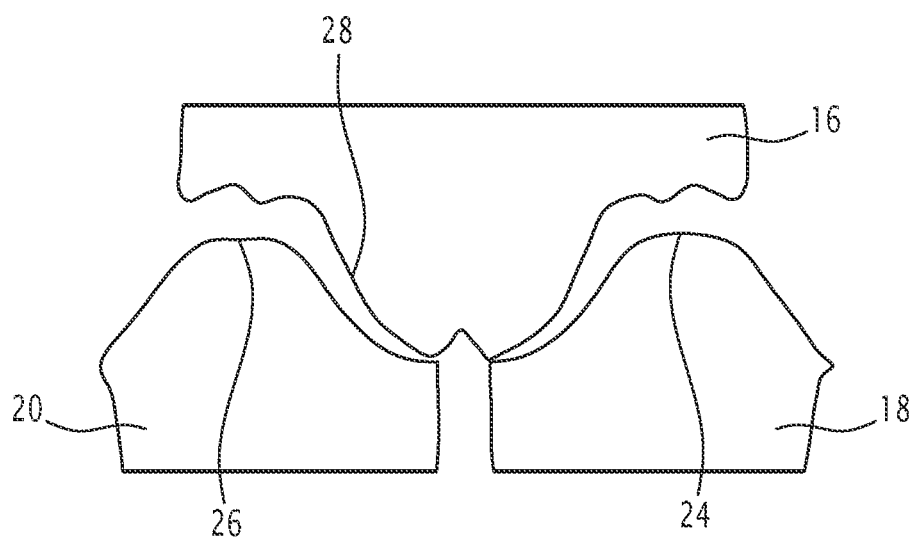

The lower part 14 and the upper part 16 are each capable of being cut from a flat pattern, visible in FIGS. 3 and 4.

More particularly, each part 18, 20 of the lower part 14 is made from a flat textile piece, with two edges of the flat piece capable of being joined, sewn together, for example, to form a generally tubular shape.

The upper part 16 is made from a flat textile piece, two edges 22 of the piece capable of being joined, sewn together, for example, most particularly at the front of the garment 10.

The lower part 14 and the upper part 16 each comprise a connecting edge.

More particularly, each part 18, 20 of the lower part 14 has a connecting edge 24, 26, said connecting edges 24, 26 together forming the connecting edge of the lower part 14.

The connecting edge 24, 26 of the lower part 14 is connected to the connecting edge 28 of the upper part 16.

More particularly, the connecting edge 24, 26 of the lower part 14 and the connecting edge 28 of the upper part 16 are sewn to each other at the seams 29.

The connecting edge 24, 26 of the lower part 14 and the connecting edge 28 of the upper part 16 do not complement each other.

The connection between the lower part 14 and the upper part 16 at the connecting edges 24, 26, 28 then forms a dart of the garment.

In particular, this makes it possible to follow the body morphology.

The dart is intended to extend at least against the groin and/or buttock crease of a user, more particularly against the groin and buttock crease of a user.

The respective pattern of the lower and upper parts is provided so that the connecting edges 24, 26, 28 extend at the groin and buttock crease of a user.

Any other embodiment of the main body 12 that allows it to be adapted to a user's morphology is conceivable.

The darts are located at another location of the main body, for example.

In a variant, the pattern is cut in one piece so that the main body 12 is fitted to the user. For example, for a male model, a shell pattern intended to encompass the genitals is provided.

The garment 10 has at least a first targeted area 30, more particularly a single first targeted area.

In the example shown, on the entire first targeted area 30, the garment comprises at least one layer of reinforcement textile 32.

More particularly, here, the main body 12, more particularly its outer side, is coated with a layer of reinforcement textile 32.

The reinforcement textile 32 is configured to not extend directly against a user.

In one embodiment not shown, the reinforcement textile 32 does not extend over the entire first targeted area 30, but only over a part of the first targeted area.

The reinforcement textile 32 is elastic and has a maximum elongation of greater than 50%, that is, it is capable of being elongated by at least 50% without suffering damage.

The maximum elongation of a material is measured here by stretching a strip of given width, 5 centimeters here, a given number of stretching cycles, equal to 5 here, in a direction of interest perpendicular to the width measurement. For each cycle, the strip is stretched by a force progressively increasing up to a predetermined force, such as equal to 6N per centimeter of width of the strip, up to 30N here. The maximum elongation here is the elongation at the predetermined force during the last stretching cycle, here the elongation at 30N at the fifth stretching cycle.

The maximum elongation of the reinforcement textile is strictly greater than the elongation of the first targeted area 30 when the garment is worn by a user.

The greater the module of the reinforcement textile 32, the greater its compressive reinforcing action.

The garment has a higher module than the module of the contention textile in the first targeted area 30.

According to one embodiment, the reinforcement textile 32 has a higher module than the compression textile.

According to another embodiment of the invention, the module of the reinforcement textile is less than or equal to the module of the compression textile.

The reinforcement textile 32 is intended to extend at least against the groin and/or buttocks of a user.

More particularly, the first targeted area 30 extends over parts of the garment intended to extend at least against the entire buttock, the buttock crease, the pubic area, and the groin hollows.

In the example shown, the first targeted area 30 extends only opposite the entire buttocks, buttock crease, pubic area and hollows of the groin.

In a variant embodiment, the first targeted area 30 further extends over the inner thighs.

Here, the first targeted area 30 is formed as a single continuous area.

The reinforcement textile 32 is sewn on or to the main body 12, with overlapping seams 34 extending around the entire periphery of the first targeted area, for example.

The seams 34 are such that they do not limit the stretching of the main body 12 and the first targeted area 30 over the intended range of use of the garment.

The reinforcement textile 32 comprises, more particularly consists of polyamide and elastane, for example. Here, the reinforcement textile 32 comprises from 40% to 50%, more particularly 48%, elastane and from 50% to 60%, more particularly 52% polyamide.

The reinforcement textile 32 here is a bi-elastic fabric, that is, elastic along two in two non-parallel tissue extension directions, here the direction of extensibility and the direction perpendicular to the direction of extensibility.

In a variant, the reinforcement textile 32 is identical to the compression textile.

The garment 10 has at least a second targeted area.

In the example shown, the garment 10 has two second targeted areas 36, 38.

On, more particularly on the entire or each second targeted area 36, 38, the garment comprises a layer of contention textile 40.

In the example shown, the main body 12, more particularly its inner side, is coated with a layer of contention textile 40.

The contention textile is capable of stiffening the area it covers so as to contain the edema swelling.

The contention textile is stiff in at least one direction of interest over its stretching range when using the garment. The at least one direction of interest here is the circumferential direction.

According to the "NF S 97-115 December 2011—Medical compression and contention textile strips" standard, the stiffness R is the "characteristic of a pressure variation obtained by the relationship of proportionality between the force F applied at a point and the resulting change in elongation at that point", and is calculated as follows:

$$R = \frac{F2 - F1}{A2 - A1},$$

expressed in N/(m*mm), where
A1 and A2 are elongations of the material whose stiffness is defined, expressed in millimeters (mm), and
F1 and F2 are the tensile forces to stretch the material at the elongations A1 and A2, respectively, expressed in Newtons per meter (N/m), corresponding to the elongations A1 and A2, respectively.

The elongations A1 and A2 here are chosen to be within the recommended use range of the garment.

For example, the contention textile has a stiffness in the direction of interest greater than or equal to 30 N/(m*mm), more particularly is between 30 and 75 N/(m*mm), over the range corresponding to normal use of the garment.

The stiffness of the contention textile in the direction perpendicular to the direction of interest is strictly lower than the stiffness of the contention textile in the direction of interest, over the range corresponding to normal use of the garment. This in particular makes it possible to increase the comfort of the user wearing the garment.

The stiffness of the contention textile in the direction of interest is strictly greater than the stiffness of the main body in the direction of interest, more particularly by at least 100%, over the range corresponding to normal use of the garment.

The stiffness of the contention textile in the direction of interest is strictly greater than the stiffness of the garment in the first targeted area in the direction of interest, more particularly by at least 100%, over the range corresponding to normal use of the garment.

For example, the contention textile has a stiffness in the direction of interest strictly greater than the stiffness of the rest of the garment, over the range corresponding to normal use of the garment.

The or one of the second targeted areas, referred to as the second lower targeted area 36, is intended to extend against the inner thighs. The second lower targeted area 36 here extends only against the inner thighs and at the crotch.

The contention textile of the second lower targeted area 36 is here attached to the main body 12, by stitching for example, at least around the entire periphery of the second lower targeted area 36.

The other of the second targeted areas, referred to as the second upper targeted area 38, is intended to extend against the pubic area of a user.

In one embodiment, the second upper targeted area 38 extends only against the pubic area.

In a variant, the second upper targeted area 38 extends only against the pubic area and the inguinal areas.

Here, the second upper targeted area 38 is included in the first targeted area 30, such that in the second upper targeted area 38, the garment comprises a reinforcement textile layer and a contention textile layer.

The contention textile in the second upper targeted area 38 is here attached to the main body 12, by sewing for example, over only a part of the periphery of the second lower targeted area 38, the contention textile forming with the main body 12 a pocket 42.

Here, a padding element is inserted into the pocket 42. The padding element is removable from the pocket 42.

The pocket advantageously provides contention due to the nature of the textile and its rigidity when worn, as well as support via the padding element, improving the comfort of a user's life when wearing the garment.

The padding element is capable of evacuating lymph flows from the skin by capturing liquid, by capillary effect in particular, for example.

The padding element is made of polyamide, for example. This makes it possible for the padding element to dry quickly.

The padding element is, for example, a Mobiderm© strip from Thuasne© with small studs covered on both sides by a polyamide textile.

The pocket makes it possible for the padding device to remain correctly positioned during the use of the product by the user, improving the user's quality of life during its use.

In particular, the garment design makes it possible for different efforts to be applied to help drain the edematous member by containing it and being capable of adapting to the morphology of the area to be treated and/or to apply pressure in specific areas where it needs to be greater to effectively drain the member.

The first targeted area makes it possible, in particular, to provide more support through a greater rigidity than outside the targeted areas.

The second targeted area makes it possible for a significant force to be applied as soon as the volume of the member increases by a minimal amount, for example, in the case of lymphoedema swelling, so as to effectively drain a swelling forming a lymphoedema.

In one alternative embodiment, the main body 12 extends over the entire surface of the garment 10 with the exception of at least one open area, more particularly with the exception of only the second targeted area or areas. Only differences from the previously described embodiment are described next.

Here, the contention textile of the or each of the second targeted areas 36, 38 is connected to the main body 12, by sewing, for example, around the periphery of the corresponding second targeted area 36, 38.

More particularly, the contention textile of the second lower targeted area 36 is connected to the main body 12 over the entire periphery of the second lower targeted area 36 in contact with the main body 12.

Here, the upper second targeted area contention textile 38 is connected to the main body 12, by stitching, for example, over only a part of the periphery of the lower second targeted area 38.

In the part of the first targeted area facing the second targeted area, the reinforcement textile then does not cover the main body. The reinforcement textile extends directly against the containment textile.

The contention textile extends over the inner side of the reinforcement textile in the part of the first targeted area facing the second targeted area.

The contention textile forms a pocket with the reinforcement textile similar to that previously described between the contention textile and the main body.

The reinforcement textile is configured not to extend directly against a user over its entire surface area.

Example 1

The garment is designed with a men's model and a women's model, for example, so as to accommodate the specific body type, and different sizes for each model.

A sizing chart for the men's and women's model is defined according to the pelvic circumference, so that the garment is adapted to the user's morphology:

| Size | 1 | 2 | 3 | 4 | 5 | 6 |
| --- | --- | --- | --- | --- | --- | --- |
| Pelvic circumference (cm) | 88-94 | 95-101 | 102-108 | 109-115 | 116-122 | 123-129 |
| Average pelvic circumference (cm) | 91 | 98 | 105 | 112 | 119 | 126 |

For each model and size, the force required to stretch the garment to the average pelvic circumference is calculated using Laplace's Law of Compression Pressure, which states that the force to be applied in N per centimeter of width, with the width being perpendicular to the circumferential direction, is equal to the pressure applied in hectopascal multiplied by the radius on which the force is applied divided by 100.

For an average pelvic circumference equal to 112 cm and a target pressure of 15 mmHg, we obtain the following calculation:

$$F(\text{N.cm}^{-1}) = R(\text{cm}) \times \frac{P(h\text{Pa})}{100} = \frac{112(\text{cm})}{2\pi} \times \frac{(15(\text{mmHg}) \times 1.33322)}{100} = 3.57 \text{ N/cm}$$

For each of the compression textile, reinforcement textile, and contention textile materials, a strip is stretched by applying a progressively increasing force as described above, to a stretching force value equal to 6 N per centimeter width of the strip, over at least five cycles, for example.

For each material, on the curve corresponding to the stretching of the material by increasing the force in the first cycle, the percentage of the material to have this force is noted. Here, for a strip of five centimeters in width, the stretching of the material corresponding to a force of 17.83 N is noted for each material.

The patterns for the main body, the reinforcement textile and the contention textile are then designed so that each material is stretched by this percentage when the garment is worn by a person with a pelvic circumference equal to the average pelvic circumference, equal to the average size 4 circumference in this example.

Thus, a user with a pelvic circumference equal to the average circumference, in this example equal to size 4, and wearing a garment according to the prescribed size, has a force of 15 mmHg applied.

Example 2

The garment is designed as described in the first example.

The garment stretching required to reach the ends of each range corresponding to a pelvic circumference is calculated by knowing the pattern of the unstretched garment.

The force required per centimeter of width to achieve such elongation is then deducted from the curves corresponding to the stretching of each material by increasing the force at the first cycle, as described previously.

Laplace's law is then used to calculate the pressure applied by the garment for each end of each range corresponding to a pelvis circumference.

$$P(\text{mmHg}) = \frac{F(\text{N.cm}^{-1}) \times 100}{R} \times \frac{1}{1.33322}$$

Thus, the garments apply average pressures of between 12 mmHg and 18 mmHg on the user, which corresponds to a conventional value range in lymphoedema treatment for the garment to have an effect but the pressure to be tolerated by a user.

Example 3

A garment corresponding to gender and pelvic circumference measurement has been put on by users, with pressure sensors marketed as PicoPress® by MICROLAB® placed between the garment and the user at different areas: pubic, groin, side of each leg and buttocks.

The garments apply pressure at different locations on the user, of between 7 mmHg and 21 mmHg, which corresponds to a conventional value range in lymphoedema treatment for the garment to have an effect but the pressure to be tolerated by a user.

The invention claimed is:

1. A compression and/or contention garment suitable for lymphedema treatment, the compression and/or contention garment comprising a main body, the main body comprising a compression textile, the compression textile having an elasticity strictly greater than 70% in at least one direction of extensibility, the compression textile having a module in accordance with the ISO standard NF EN 14704-1 of June 2005 on the determination of the elasticity of fabrics that is greater than or equal to 3.5 N at an elongation of 40% on the fifth load curve in the direction of extensibility,
the compression and/or contention garment having at least a first targeted area, in which the compression and/or contention garment comprises at least one layer of reinforcement textile in the first targeted area, the compression and/or contention garment having a module in the first targeted area that is greater than the module of the compression textile,
the compression and/or contention garment having at least a second targeted area in which the compression and/or contention garment comprises at least one layer of contention textile, the at least one layer of contention textile having a stiffness in at least one direction of interest greater than or equal to 30 N/(m*mm) over any normal range of use of the compression and/or contention garment,
the stiffness of the at least one layer of contention textile in the direction of interest being strictly greater than the stiffness of the main body in the direction of interest over a normal range of use of the compression and/or contention garment,
the stiffness of the at least one layer of contention textile in the direction of interest being strictly greater than the stiffness of the compression and/or contention garment in the first targeted area in the direction of interest,
wherein the compression and/or contention garment is configured so that, when worn by a user, the at least one layer of reinforcement textile extends at least against the user's buttock crease, pubic area and/or buttocks, thereby treating genital and/or pelvic lymphedema,
wherein the first targeted area is formed as a single continuous area, and
wherein the at least one layer of reinforcement textile is sewn on or to the main body, with overlapping seams extending around an entire periphery of the first targeted area.

2. The compression and/or contention garment according to claim 1, in which the direction of extensibility of the compression textile and/or the direction of interest correspond to a circumferential direction of the compression and/or contention garment.

3. The compression and/or contention garment according to claim 2, in which the compression textile is provided such that the compression textile requires a stretching force, in the direction of extensibility, greater than or equal to 7N, to achieve 40% elongation in a first stretching cycle.

4. The compression and/or contention garment according to claim 2, in which the at least one layer of contention textile is intended to extend at least against the user's pubic area and/or the user's inner thighs.

5. The compression and/or contention garment according to claim 2, in which the main body extends over the entire compression and/or contention garment except for the second targeted area.

6. The compression and/or contention garment according to claim 1, in which the compression textile is provided such that the compression textile requires a stretching force, in the direction of extensibility, greater than or equal to 7N, to achieve 40% elongation in a first stretching cycle.

7. The compression and/or contention garment according to claim 6, in which the at least one layer of contention textile is intended to extend at least against the user's pubic area and/or the user's inner thighs.

8. The compression and/or contention garment according to claim 6, in which the main body extends over the entire compression and/or contention garment except for the second targeted area.

9. The compression and/or contention garment according to claim 1, in which the main body comprises at least a first part and a second part, the first part and the second part each being capable of being cut from a flat pattern, the first part and the second part each comprising a connecting edge, the connecting edge of the first part and the connecting edge of the second part not complementing each other, the connecting edge of the first part being connected to the connecting edge of the second part by a dart.

10. The compression and/or contention garment according to claim 9, in which the dart is intended to extend at least against the user's groin and/or buttock crease.

11. The compression and/or contention garment according to claim 1, in which the compression textile and/or the at least one layer of reinforcement textile comprises polyamide and elastane.

12. The compression and/or contention garment according to claim 11, in which the compression textile and/or the at least one layer of reinforcement textile consists of polyamide and elastane.

13. The compression and/or contention garment according to claim 1, in which the at least one layer of contention textile is intended to extend at least against the user's pubic area and/or the user's inner thighs.

14. The compression and/or contention garment according to claim 1, in which the main body extends over the entire compression and/or contention garment except for the second targeted area.

15. The compression and/or contention garment according to claim 1, having at least one pocket adapted to removably receive at least one padding element.

16. The compression and/or contention garment according to claim 1, in which the stiffness of the at least one layer of contention textile in the direction of interest is strictly greater by at least 100% than the stiffness of the compression and/or contention garment in the first targeted area in the direction of interest.

* * * * *